United States Patent
Cociglio et al.

(10) Patent No.: US 9,444,749 B2
(45) Date of Patent: Sep. 13, 2016

(54) APPARATUS AND METHOD FOR SELECTIVELY DELAYING NETWORK DATA FLOWS

(75) Inventors: Mauro Cociglio, Torino (IT); Mario Ullio, Torino (IT)

(73) Assignee: TELECOM ITALIA S.p.A., Milan (IT)

( * ) Notice: Subject to any disclaimer, the term of this patent is extended or adjusted under 35 U.S.C. 154(b) by 180 days.

(21) Appl. No.: 14/352,528

(22) PCT Filed: Oct. 28, 2011

(86) PCT No.: PCT/EP2011/068936
§ 371 (c)(1),
(2), (4) Date: Apr. 17, 2014

(87) PCT Pub. No.: WO2013/060378
PCT Pub. Date: May 2, 2013

(65) Prior Publication Data
US 2014/0241164 A1    Aug. 28, 2014

(51) Int. Cl.
*H04L 12/825* (2013.01)
*H04L 12/859* (2013.01)
(Continued)

(52) U.S. Cl.
CPC ........... *H04L 47/25* (2013.01); *H04L 43/0888* (2013.01); *H04L 43/16* (2013.01); *H04L 47/2475* (2013.01); *H04L 47/323* (2013.01); *H04L 47/40* (2013.01)

(58) Field of Classification Search
CPC .............. H04L 47/10; H04L 47/2416; H04L 47/2475; H04L 47/801; H04L 47/803
See application file for complete search history.

(56) References Cited

U.S. PATENT DOCUMENTS

| 7,321,556 | B1 | 1/2008 | Parekh et al. |
| 7,349,337 | B1 | 3/2008 | Mahdavi |

(Continued)

FOREIGN PATENT DOCUMENTS

| WO | 02/09389 A2 | 1/2002 |
| WO | 2004/057817 A2 | 7/2004 |

OTHER PUBLICATIONS

Arata Koike, "Active TCP Control by a Network", Global Telecommunications Conference, pp. 1921-1925, 1999, XP001003933.

(Continued)

*Primary Examiner* — Siming Liu
(74) *Attorney, Agent, or Firm* — Oblon, McClelland, Maier & Neustadt, L.L.P

(57) ABSTRACT

A control system managing data flows between a sender data processor and a recipient data processor. The data flows originate at the recipient data processor and pass through at least one telecommunications network gateway. The control system includes: a data flow identifier operable to discriminate data packets, sent by the sender data processor to the recipient data processor, as belonging to different data flows depending on respective software applications from which the data flows are originated; and an acknowledgement packet delayer operable to detect acknowledgment packets sent by the recipient data processor for acknowledging receipt of corresponding data packets received from the sender data processor, to discriminate among the acknowledgment packets depending on the data flow to which the acknowledgment packets pertains, and to selectively delay forwarding of the acknowledgment packets to the sender data processor, the selectively delaying depending on the data flow to which the acknowledgment packets relate.

19 Claims, 6 Drawing Sheets

(51) Int. Cl.
*H04L 12/823* (2013.01)
*H04L 12/893* (2013.01)
*H04L 12/26* (2006.01)

(56) References Cited

U.S. PATENT DOCUMENTS

2003/0149715 A1    8/2003  Ruutu et al.
2003/0221008 A1*  11/2003  England ............. H04L 12/5695
                                                          709/226
2006/0020702 A1    1/2006  England et al.
2006/0020703 A1    1/2006  England et al.
2006/0165029 A1    7/2006  Melpignano et al.

OTHER PUBLICATIONS

H. Balakrishnan, et al., "TCP Performance Implications of Network Path Asymmetry", Best Current Practice, pp. 1-41, 2002, XP015009232.
International Search Report issued Jun. 26, 2012, in PCT/EP2011/068936, filed Oct. 28, 2011.

* cited by examiner

APPARATUS AND METHOD FOR SELECTIVELY DELAYING NETWORK DATA FLOWS

BACKGROUND OF THE INVENTION

1. Field of the Invention

The present invention relates to telecommunications networks, and particularly to computer networks. More specifically, the present invention relates to computer networks which operate according to transfer protocols that rely on acknowledgment of correct data transmission.

2. Description of the Related Art

In the last years the use of telecommunication networks for interconnecting computers—from Local Area Networks (LAN) to the Internet, passing through Wide Area Networks (WAN)—has constantly raised, both for working and entertaining purposes. At the same time, software applications exploiting telecommunication networks have grown in number and functionality provided, along with number and dimensions of contents made available through the telecommunication networks. Hence, the flows of data continuously transferred through the network components (e.g. network backbones, gateways and the like) have greatly increased to the point that solutions for controlling the network data traffic have become necessary in order to avoid a congestion of the network.

For the purpose of the present invention, with the term "software application" it is intended a computer software designed to help users to perform specific tasks, said computer software being able to interact directly with both the user and the application layer, such as the Open System Interconnection (OSI) application layer. Software applications designed to run on data processing terminals like Personal Computers (PC), smart phones and the like may for convenience be distinguished based on their degree of interaction with the user when they run on the user's data processing terminal. There are software applications that, when running, require a relatively low interaction with the user, operate in an almost completely automatic way, may have a relatively low Quality of Service (QoS), and can tolerate losses of data packets; this is for example the case of Peer-to-Peer (P2P) applications, allowing for a direct data exchange between user terminals. Other software applications, like for example applications for Web browsing, for the fruition of audio and/or video contents distributed in streaming, for VoIP (Voice over IP), exhibit by their own nature a relatively high degree of interactivity with the user (that is the user plays an active role while browsing the Web, and it is presumed that his/her attention is focused on the audio/video content he/she is enjoying). For these applications, a high QoS need to be ensured. Hereinafter, for the sake of conciseness, software applications of the first class defined above will be also referred to as "background software applications", whereas software applications of the second class will be also referred to as "foreground software applications".

Nowadays, the diffusion of P2P applications has become so pervasive that P2P data traffic represents a relevant portion of the total telecommunication network data traffic. P2P data traffic by its own nature tries to constantly occupy as much transmission band as possible, in order to speed up the data exchange. This may cause a congestion of the network, which, as a reaction, may casually drop some data packets (also referred to as "datagrams"). The dropped data packets need to be retransmitted, and this slows down the respective data flows. This is particularly penalizing for foreground software applications, usually operating in parallel with P2P applications (it is easy to imagine how annoying it is for a user when a VoIP call suffers of high latency, or an audio/video stream suffers of repeated blockages).

In order to overcome network congestion problems, network apparatuses implementing complex analysis mechanisms for classifying data traffic associated with background software applications (such as P2P applications) have been proposed.

U.S. Pat. No. 6,950,393 discloses a packet transfer apparatus for a network system. The apparatus comprises a packet receiver that accepts an input of packets from a first network segment, a packet classifier that classifies packets based on their respective process flows, a packet discarder to discard packets and a packet sender that sends packets to a second network segment.

International application No. WO 2000/21233 discloses a link layer entity receiving data packets from a source and forwarding the data packets to a forward data link, said link layer entity storing the received data packets in a data packet buffer until the data packets depart the link layer entity and they are forwarded to the forward link. There is also disclosed an acknowledgement pacing device, coupled to the link layer entity, for pacing acknowledgement packets to be sent to the source in response to receiving the data packets from the source. The acknowledgement pacing device includes: an acknowledgement control unit for monitoring congestion at the link layer entity and generating a control signal for controlling the processing of acknowledgement packets based upon whether congestion is occurring at the link layer entity; an acknowledgement packet buffer, coupled to the acknowledgement control unit, for storing acknowledgement packets received from the acknowledgement control unit and a scheduler, coupled to the acknowledgement control unit and the acknowledgement buffer, said scheduler releasing acknowledgement packets to the source based upon the control signal generated by the acknowledgement control unit.

U.S. patent application No. 2005/0190694 discloses a data packet classifier to classify a plurality of N-bit input tuples, said classifier comprising a hash address generator, a memory and a comparison unit. The hash address generator generates a plurality of M-bit hash addresses from said plurality of N-bit input tuples, wherein M is significantly smaller than N. The memory has a plurality of memory entries and is addressable by said plurality of M-bit hash addresses, each of such addresses corresponding to a plurality of memory entries, each of said plurality of memory entries being capable of storing one of said plurality of N-bit tuples and an associated process flow information. The comparison unit determines if an incoming N-bit tuple can be matched with a stored N-bit tuple. The associated process flow information is output if a match is found, whereas a new entry is created in the memory for the incoming N-bit tuple if a match is not found.

SUMMARY OF THE INVENTION

The Applicant has noticed that the solutions known in the art fail in providing a satisfying data traffic management.

For example, in the solution disclosed by U.S. Pat. No. 6,950,393 the selective packet drop carried out by the packet transfer apparatus involves a packets retransmission by the sender, which can cause a congestion of the network.

The link layer entity proposed in WO 2000/21233 unselectively buffers all the received data packets. In this way, the operation of all software applications is slowed down regardless of whether the software application is a foreground or a background software application. This implies that data packets belonging to the foreground software applications are delayed, thus resulting in a perception of poor performance of the network by the user which interacts with such software applications.

Finally, the data packets classifier described in the US 2005/0190694 is able to identify to which software application a data flow included in a data traffic through the network is associated, but it does not implement any solution for regulating such data traffic.

In general terms, the solution according to one or more embodiments of the present invention is based on selectively delaying the data transmission associated to one or more background software applications (namely software applications operating in an almost completely automatic way) in order to avoid performance reduction of foreground software applications (namely software applications involving a continuous interaction with the users).

In particular, one or more aspects of the solution according to specific embodiments of the present invention are set out in the independent claims, with advantageous features of the same solution that are set out in the dependent claims.

More specifically, one aspect of a solution according to an embodiment of the present invention provides a control system for managing data flows between at least one sender data processor and at least one recipient data processor. Said data flows are originated by software applications running on the recipient data processor and pass through at least one gateway of a telecommunications network. The control system includes a data flow identifier which is operable to discriminate data packets, sent by the sender data processor to the recipient data processor, as belonging to different data flows depending on respective software applications from which the data flows are originated. The control system further comprise an acknowledgement packet delayer which is operable to detect acknowledgment packets sent by the recipient data processor for acknowledging the receipt of corresponding data packets received from the sender data processor, in order to discriminate among the acknowledgment packets depending on the data flow to which the acknowledgment packets pertains, and to selectively delay the forwarding of the acknowledgment packets to the sender data processor, said selectively delaying depending on the data flow to which the acknowledgment packets relate.

Advantageously, the control system may further comprise a flow monitor module which is operable to monitor a usage of transmission bandwidth of said gateway by said data flows and a supervisor module which is operable to command said acknowledgement packet delayer to start selectively delaying the forwarding of the acknowledgment when a threshold transmission bandwidth usage is reached.

The supervisor module may also be operable to classify the data flows originated by software applications running on the recipient data processor in at least one first data flow class (comprising data flows originated by a background software applications running on the recipient data processor) and at least one second data flow class (comprising data flows originated by a foreground software application running on the recipient data processor); and the acknowledgement packet delayer may be operable to selectively delay the forwarding to the sender data processor of the acknowledgment packets of data flows belonging to the first data flows class.

Moreover, the acknowledgement packet delayer may include a plurality of acknowledgment packet queues, each of which, in use, may be operable to store acknowledgment packets of the at least one first data flows class.

The supervisor module may comprise modules which are operable to determine the selective delay to be applied to the forwarding of the acknowledgment packets of the data flows belonging to the at least one first data flows class based on a current number of data flows belonging to the at least one first data flow class.

The supervisor module may be operable to detect a start of a new data flow of the at least one first data flows class and accordingly modify said current number of data flows classified in the at least one first data flows class.

Advantageously, the control system according may further comprise a module operable to detect a conclusion of an ended data flow classified in the at least one first data flow class; and the supervisor module may be operable to accordingly modify the current number of data flows classified in the at least one first data flows class.

Furthermore, the supervisor module may be operable to dissociate the ended data flow classified in the at least one first data flows class from a corresponding one acknowledgment packet queue out of the plurality of acknowledgment packet queues.

In addition, the supervisor module may be operable to adjust each selective delaying of the forwarding of acknowledgement packet as a function of variations in the usage of transmission bandwidth by the data flows.

Another aspect of a solution according to an embodiment of the present invention provides a corresponding method for managing data flows at least one sender data processor and at least one recipient data processor, said data flows being originated by software applications running on the recipient data processor and passing through at least one gateway of a telecommunications network. The method includes the steps of discriminating data packets, sent by the sender data processor to the recipient data processor, as belonging to different data flows depending on respective software applications from which the data flows are originated; detecting acknowledgment packets sent by the recipient data processor for acknowledging the receipt of corresponding data packets received from the sender data processor; discriminating among the acknowledgment packets depending on the data flow to which the acknowledgment packets pertains; and selectively delaying the forwarding of the acknowledgment packets to the sender data processor, said selectively delaying depending on the data flow to which the acknowledgment packets relate.

Advantageously, the method may further comprise the steps of monitoring a usage of transmission bandwidth of said gateway by said data flows; and selectively delaying the forwarding of the acknowledgment when a threshold transmission bandwidth usage is reached.

Furthermore, the method, may further comprise the steps of classifying the data flows originated by software applications running on the recipient data processor in at least one first data flow class (comprising data flows originated by a background software applications running on the recipient data processor), and at least one second data flow class comprising data flows (originated by a foreground software application running on the recipient data processor); and selectively delaying the forwarding to the sender data processor of the acknowledgment packets of data flows belonging to the first data flows class.

The method may further comprise the step of storing acknowledgment packets of the at least one first data flows class in a plurality of acknowledgment packet queues.

Moreover, the method may further comprises the step of determining the selective delay to be applied to the forwarding of the acknowledgment packets of the data flows belonging to the at least one first data flows class based on a current number of data flows belonging to the at least one first data flow class.

The method may further comprise the steps of: detecting a start of a new data flow of the at least one first data flow class; and accordingly modifying said current number of data flows classified in the at least one first data flows class.

Advantageously, the method may further comprise the steps of detecting a conclusion of an ended data flow classified in the at least one first data flow class; and accordingly modifying the current number of data flows classified in the at least one first data flows class.

The method may further comprising the step of dissociating the ended data flow classified in the at least one first data flows class from a corresponding one out of the plurality of acknowledgment packet queues.

In addition, the method may further comprise the step of adjusting each selective delaying of the forwarding of acknowledgement packet as a function of variations in the usage of transmission bandwidth by the data flows.

A further aspect of a solution according to an embodiment of the present invention provides a corresponding gateway adapted to route data packets sent from a sender data processor to a recipient data processor, and to route acknowledgement packets from the recipient data processor to the sender data processor, in a telecommunications network, said gateway including a control system according to the first aspect set forth above.

BRIEF DESCRIPTION OF THE DRAWINGS

These, and others, features and advantages of the solution according to the present invention will be better understood with reference to the following detailed description of some embodiments thereof, provided merely by way of exemplary and non-limitative purposes, to be read in conjunction with the attached drawings. In particular.

DETAILED DESCRIPTION OF EXEMPLARY EMBODIMENTS OF THE INVENTION

Figure 1:
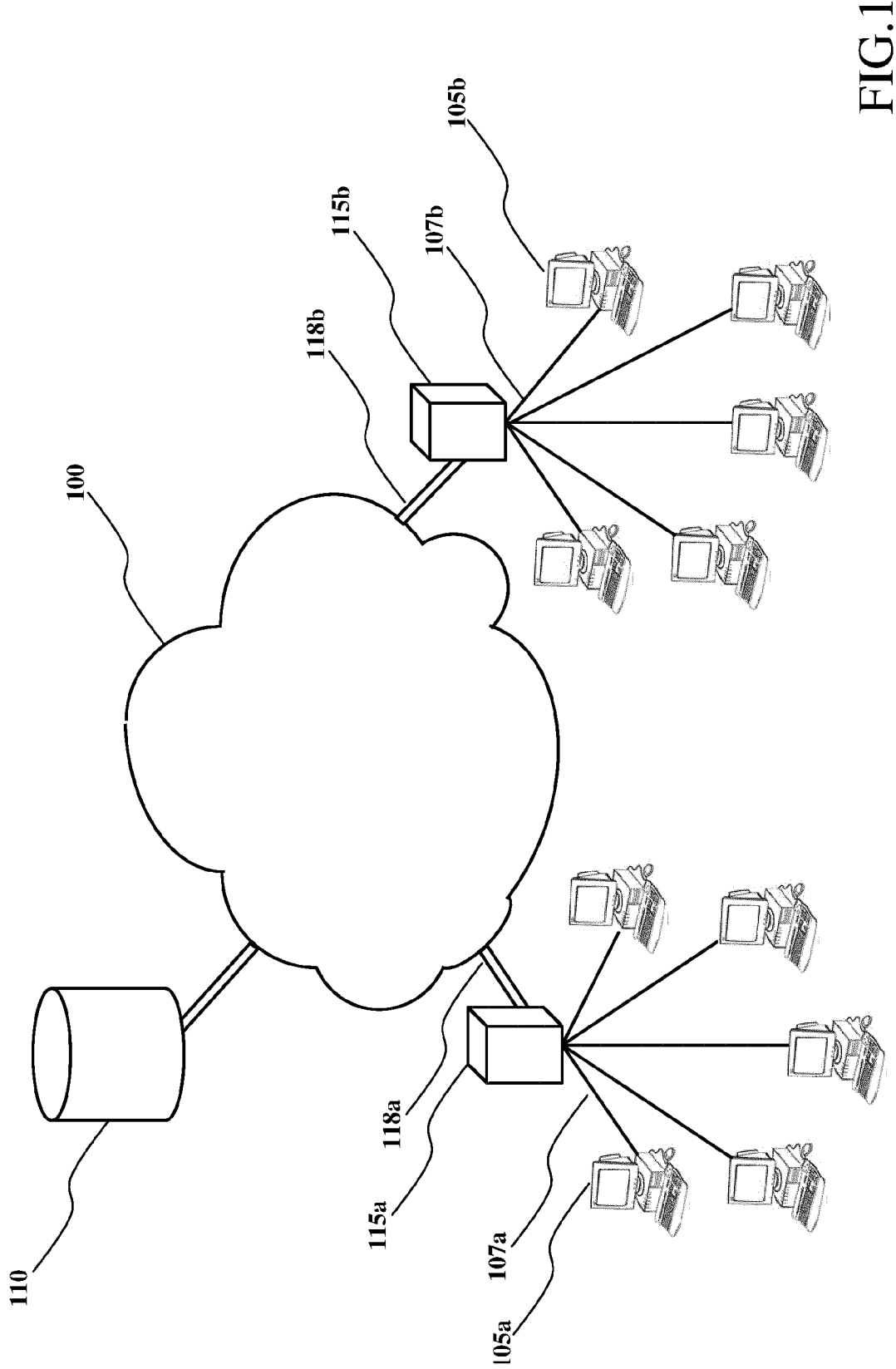
FIG. 1 schematically illustrates a telecommunication network.

With reference to FIG. 1, there is schematically illustrated a telecommunication network 100. The telecommunication network 100, which may be a Local Area Networks—LAN—, or a Wide Area Network—WAN, or the Internet, or a combination thereof, allows a plurality of clients, such as user terminals or hosts—usually data processors such as Personal Computers (PC) or smart phones—, two of which are denoted in FIG. 1 with reference numerals 105a (first client) and 105b (second client), to access data made available by content providers designed to store large amounts of data (e.g., web pages, electronic documents, electronic files of the most disparate nature, multimedia files, for example video data, audio data and the like), such as a content provider 110, or to exchange data with each other.

In detail, any client, such as the first client 105a and the second client 105b, in order to transfer data through the network 100 may be connected by means of a respective connection cable or a wireless connection (denoted as 107a and 107b in the figure, for example, a copper cable or an optical fiber) to a port (not shown) of a respective network gateway 115a (first gateway) and 115b (second gateway), such as a router or a hub. The gateways 115a and 115b are adapted to receive at their ports several connections from clients (e.g., each client 105a, 105b is connected to a respective port of the respective gateway 115a, 115b) spread over an area (e.g., an office, a city district etc.). The gateways 115a and 115b are connected, through respective data cables 118a and 118b, to the network 100.

In operation, the gateways 115a and 115b allocate a portion of an available transmission band for the data transmission to and from the clients connected thereto, like the clients 105a and 105b. The gateways 115a and 115b route the data transmitted by a sender (which can be one of the clients, or one of the content providers) towards its destination, i.e. towards the intended recipient(s); senders and recipients are thus logically connected by respective data paths. Particularly, the transmission of data over the telecommunication network 100 from a sender to a recipient occurs according to a transfer protocol which provides for the subdivision of large blocks of data into a sequence of data packets or datagrams (ordered from the first datagram to the last datagram). Each data packet (after the first one) is individually sent from the sender to the recipient after the sender has received an acknowledgment of correct reception of the preceding packet (in jargon, an acknowledgment packet) sent by the recipient. One of the most popular and widely used transfer protocols implementing this transmission policy is the well-known Transfer Control Protocol ("TCP"). However, it is pointed out that the present invention is not limited to that particular protocol. It may also be applied to other protocols such as for example the Stream Control Transmission Protocol (SCTP) and in general, to all protocols based on the acknowledgment of a correct receipt of the sent data packets. It should be noted that in a data transmission between a sender and a recipient based on the TCP—also identified as a "TCP session"—each data packet includes a header (e.g., a tuple) that univocally identifies the sender and the recipient of the data packet, allowing the gateways to route the data packets to the correct data path towards the recipient or the sender.

For example, in the scenario depicted in FIG. 1, one or more foreground software applications, e.g., a Web browser, a video streaming application, etc., running on the first client 105a, may establish one or more TCP sessions with the content provider 110 in which the first client 105a receives data packets (e.g., composing a hypertext document, a video file, etc.) transmitted from the content provider 110 through the first gateway 115a after the content provider 110 has received back acknowledgment packets from the first client 105a through the first gateway 115a. In the meantime, one or more background software applications, such as P2P applications, running on the first client 105a, may establish one or more P2P sessions with one or more other clients, for example with the second client 105b. It is pointed out that also the P2P sessions operate according to the TCP, and thus the P2P sessions are TCP sessions themselves. The P2P applications are typically used for transferring large amounts of data (e.g., in the order of GBytes) between clients, the transfer taking place in an automatic way or requiring a minimum interaction with the users.

It should also be noted that each gateway 115a and 115b could allocate a finite maximum transmission bandwidth (that is, a maximum bit-rate, measured in bits per second) to each one of its ports. This means that each established TCP session—associated with the clients 105a and 105b connected to the gateway ports—has to share said finite maximum transmission bandwidth. Since P2P sessions, i.e. TCP sessions associated with P2P applications running on the clients, are configured for occupying as much transmission bandwidth as they can, when P2P data traffic is very high, a congestion of the network in terms of available transmission bandwidth can occur, that may lead to considerably slow down the performances of the entire network.

In particular, during a congestion of the network the volume of data, i.e. the number of data packets, that the gateways are required to transfer is so high that the available transmission bandwidth results to be insufficient. In these conditions, the gateways, in order to try to exit from the congestion condition, arbitrarily drop some data packets so as to reduce their overall number (thereby reducing the data volume). When dropping data packets, the gateways do not make any distinction between data packets belonging to TCP sessions of background software applications and data packets belonging to TCP sessions of foreground software applications: data packets are dropped in an indiscriminate way.

Dropped data packets then need to be retransmitted. This causes a delay in the transfer of data with a consequent worsening of the QoS perceived by the users.

Typically, a user interacts actively with foreground software applications (for example, when the user browses Web pages, or he/she is engaged in a VoIP call, or he/she is enjoying streaming audio/video), while background software applications, like P2P applications, run almost completely in an automatic way (usually the user only sets the data to exchange in a startup phase of the data transfer session). Hence, during a network congestion, the user often perceives only, or at least mainly, the delays (caused by the data packets drop) affecting data transfer of the foreground software applications and not the delays affecting data transfer of the background software applications. This can lead the user to consider the delays affecting the data transfer of the foreground software applications as due to poor performances of the software applications and/or inefficiency of the network.

According to the present invention, a control system is provided, configured and operable for controlling and selectively limiting the transmission bandwidth occupied by each established TCP session in order to improve the performances of the network in terms of QoS as perceived by the user.

Figure 2:
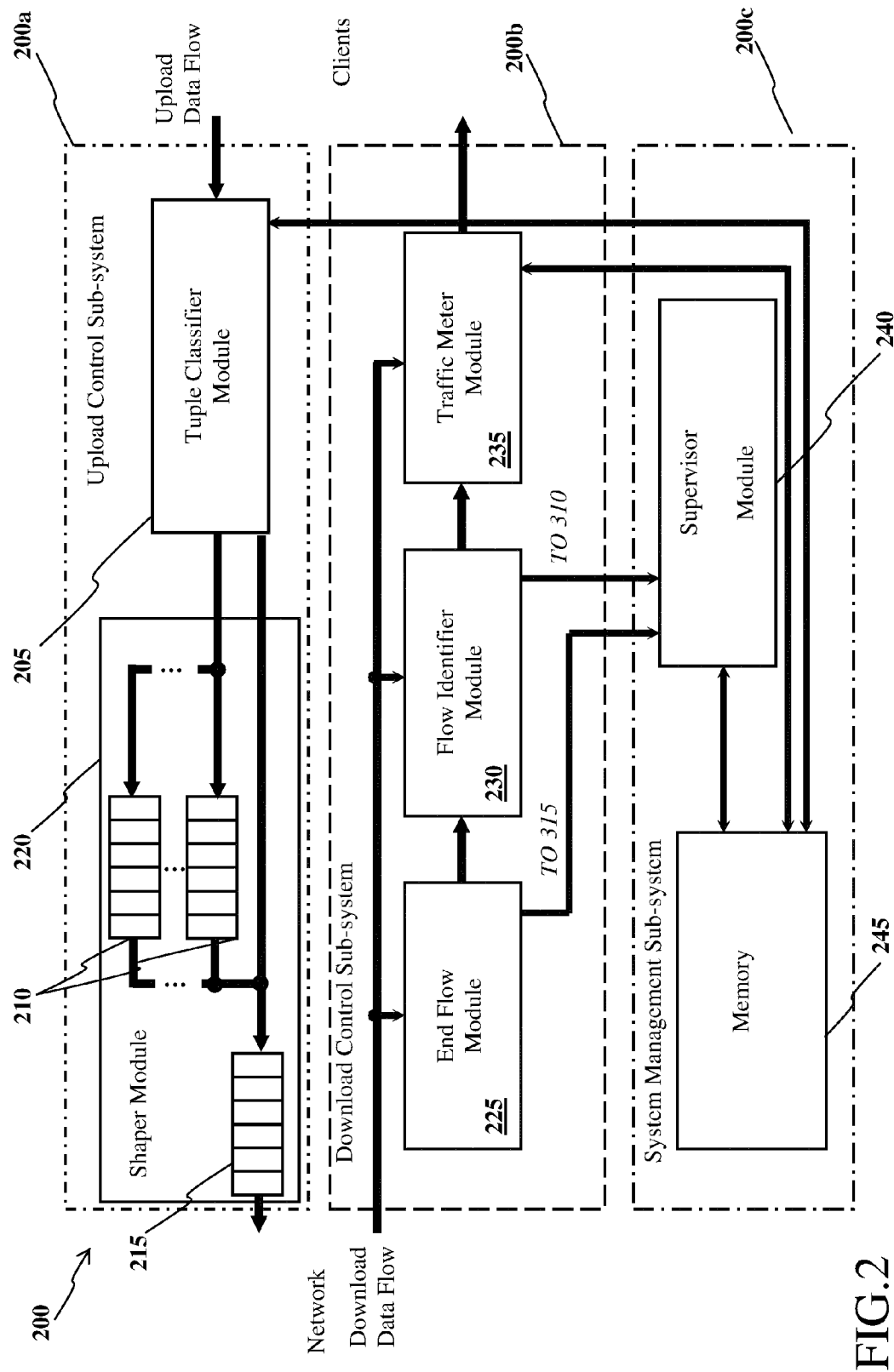
FIG. 2 illustrates a schematic block diagram of a control system according to an embodiment of the present invention.

An embodiment of a control system 200 according to the present invention is schematically depicted in FIG. 2. The control system 200 may be for example implemented in one or more gateways of the network 100, such as the first gateway 115a and/or the second gateway 115b. Alternatively, the control system 200 may be a distinct, independently designed network device connected between a gateway, such as the first gateway 115a and/or the second gateway 115b, and the respective clients, such as the first client 105a and/or the second client 105b, respectively, or the control system 200 may be connected between at least one gateway (such as the gateway 115a and 115b) and the network 100, i.e., at the gateway-to-network interface.

In particular, the control system 200 is adapted to control the two-way (in jargon, duplex) data transmission supported by each established TCP session. In detail, each established TCP session includes a data transmission from the clients 105a and 105b towards the gateways 115a and 115b—hereinafter defined as "upload data flow"—and a data transmission from the gateways 115a and 115b towards the clients 105a and 105b—hereinafter defined as "download data flow". Upload data flows share a portion of the transmission bandwidth defined as "upload bandwidth", whereas download data flows share a portion of the transmission bandwidth defined as "download bandwidth". It should be noted that the download bandwidth usually is substantially larger than the upload bandwidth (this because usually the amount of data received by a client is much larger than the amount of data transmitted by the same client). This implies that a network congestion often occurs when a maximum download bandwidth usage is reached.

Referring to the scenario depicted in FIG. 1, it is assumed, purely by way of example, that the control system 200 is included in the first gateway 115a; the control of data transmission to and from the first client 105a will be hereinafter explained.

Specifically, in the exemplary invention embodiment here considered, the control system 200 includes an upload control sub-system 200a, adapted to control upload data flows of data packets passing through the first gateway 115a coming from the first client 105a and to be routed towards another client—such as the second client 105b—or towards a content provider—such as the content provider 110. In particular, upload data flows include acknowledgment packets generated by the first client 105a in response to the reception of data packets of download data flows sent by the second client 105b (in the case of background software applications) or by the content provider 110 (in the case of foreground software applications). The control system 200 further includes a download control sub-system 200b, adapted to control download data flows of data packets passing through the first gateway 115a, coming from the network 100 (i.e. sent by the second client 105b or by the content provider 110) and to be routed to the first client 105a.

The control system 200 also includes a management sub-system 200c, adapted to manage the operation of the whole control system 200.

In more detail, the upload control sub-system 200a includes a Tuple classifier module 205, which provides its output to a shaper module 220, comprising a plurality of acknowledgment queue sub-modules 210 and an output queue sub-module 215. The plurality of acknowledgment queue sub-modules 210 and the output queue sub-module 215 are configured to store acknowledgment packets. Specifically, the Tuple classifier module 205 is configured for receiving and analyzing the upload data flows coming (in the considered example) from the first client 105a, in order to identify acknowledgment packets sent by the first client 105a, and selectively store the identified acknowledgement packets (as will be described in the following) into either one out of the plurality of acknowledgment queue sub-modules 210, or the output queue sub-module 215 (as will be described in the following). In turn, the output queue sub-module 215 selectively receives, as inputs, the output of the Tuple classifier module 205 or the output of one out of the plurality of acknowledgment queue sub-modules 210 (as will described in greater detail in the following).

The shaper module 220 is configured for extracting (in jargon, "shaping") the acknowledgment packets stored in the output queue sub-module 215 and forwarding them towards the entity (content provider 110 or second client 105*b*, in the considered example) that has sent to the first client 105*a* the data packets to which the acknowledgement packets correspond. The shaper module 220 is also configured for transferring the acknowledgment packets that are stored in the acknowledgment queue sub-modules 210 to the output queue sub-module 215 (based on a criterion that will be described in the following) and then forwarding them to the proper entity. In other words, the shaper module 220 and the tuple classifier module 205 operate as a selective acknowledge packets delayer as will be described in greater detail in the following.

The download control sub-system 200*b* includes an end flow module 225, a (data) flow identifier module 230 and a traffic meter module 235 each connected to the management sub-system 200*c*. In more detail, the end flow module 225 is adapted to recognize the end of each one of the TCP sessions associated to an incoming download data flow; the flow identifier module 230 is adapted to identify which type of software application is associated with each one of the considered TCP sessions; the traffic meter module 235 is adapted to perform measures on the transmission bandwidth usage associated with each one of the considered TCP sessions. Specifically, each data packet of any download data flow passing through the download control sub-system 200*b* is analyzed (as will be described in the following) by each one of the modules 225, 230, 235, and then routed towards the first client 105*a*. The results of such analyses are provided to the management sub-system 200*c*.

The management sub-system 200*c* is operatively coupled to both the sub-systems 200*a* and 200*b* and it is configured for managing the operation of the whole control system 200. In particular, the management sub-system 200*c* includes a supervisor module 240 and a memory 245 coupled thereto. The memory 245 is also coupled to the tuple classifier module 205 and to the traffic meter module 235. The memory 245 is used to store information necessary for the operation of the control system 200. In particular, the memory 245 is used to store variables needed by the whole control system 200 in order to perform the transmission bandwidth control, as will be described in greater detail later on.

Figure 3:
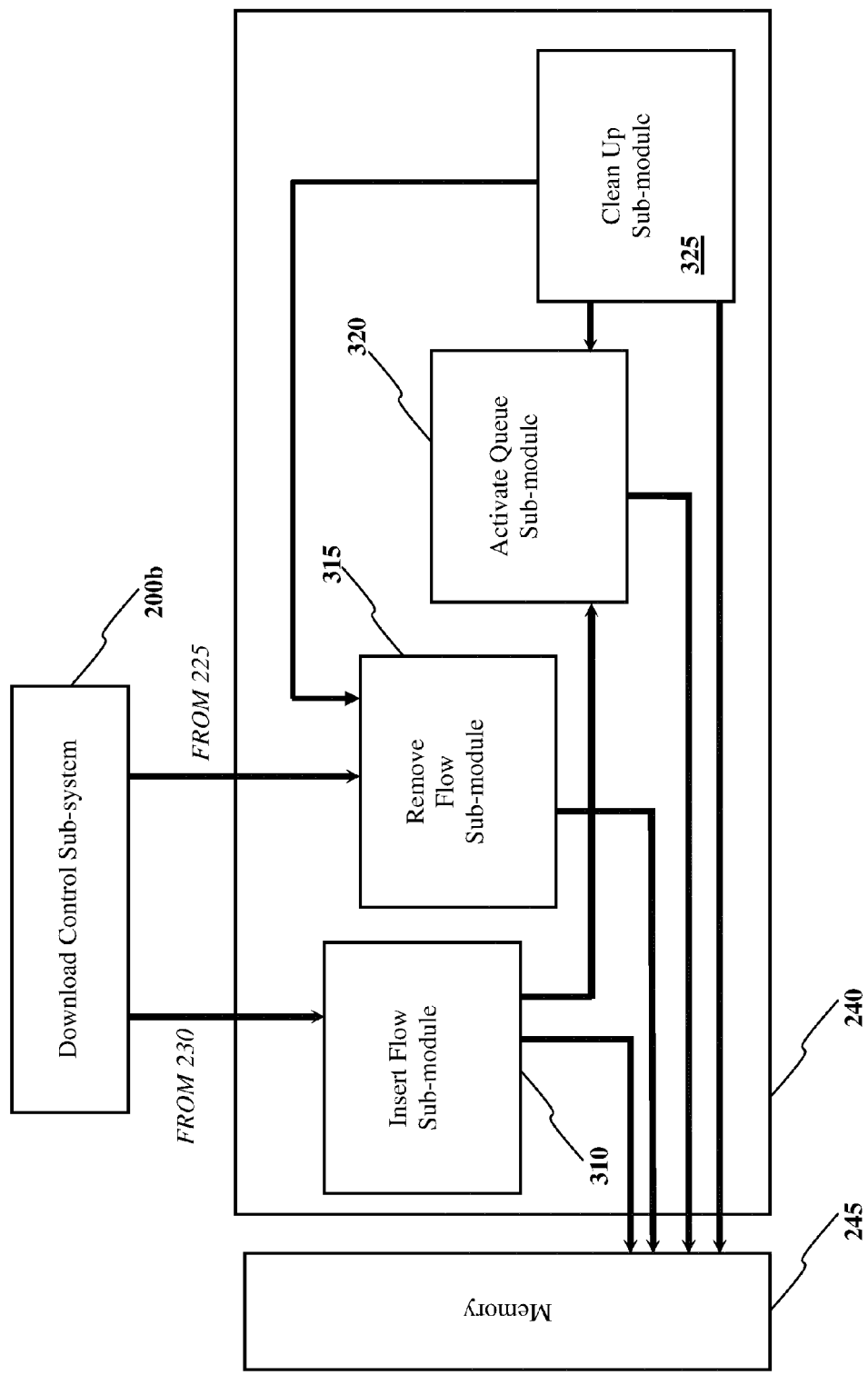
FIG. 3 illustrates a schematic block diagram of a supervisor module included in the control system of FIG. 2.

The structure of the supervisor module 240 is now described with reference to FIG. 3, wherein a schematic block diagram of the supervisor module 240 is shown. The supervisor module 240 includes an insert flow sub-module 310, a remove flow sub-module 315, an activate queue sub-module 320, and a clean-up sub-module 325.

The insert flow sub-module 310 is adapted to store in the memory 245 information (described in greater detail later on) received from the flow identifier module 230 and related to established TCP sessions between the first client 105*a* and the content provider 110 and/or the second client 105*b*. The remove flow sub-module 315 is adapted to remove, from the memory 245, information (described in greater detail later on) received from the end flow module 225 and related to TCP sessions that have been concluded. The clean-up sub-module 325 is adapted to verify and to adjust the information stored in the memory 245 in order to optimize the operation of the control system 200 (as will described in further detail in the following). The insert flow sub-module 310 and the clean-up sub-module 325 also provide respective outputs to the activate queue sub-module 320. The activate queue sub-module 320 is adapted to associate acknowledgment queue sub-modules 210 to selected upload data flows in such a way that a generic one of the queue sub-modules 210 is assigned to a corresponding upload data flow and the acknowledgement packets corresponding to the TCP sessions associated to said upload data flow are stored in the assigned queue sub-module 210, as will be described in detail later on.

Figure 4:
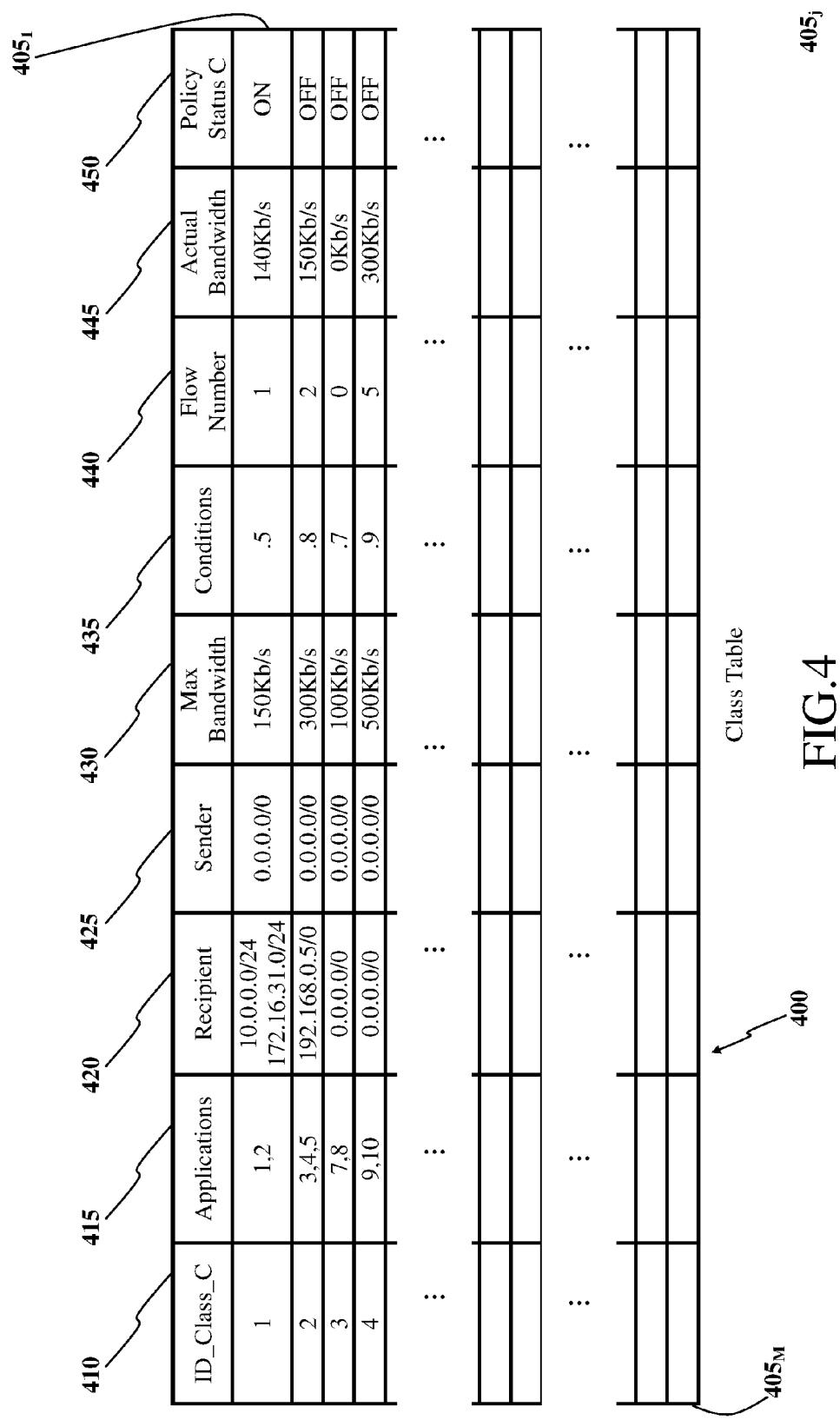
FIG. 4 conceptually illustrates a class table stored in a memory included in the control system of FIG. 2.

For its operation, the control system 200 exploits the information stored in the memory 245, in a sector indicated as class table 400, the structure of which is conceptually illustrated in FIG. 4.

Specifically, the operation of the control system 200 is based on a classification of the TCP sessions according to a criterion that takes into account the nature of the software applications that require the establishment of the TCP sessions. Each row 405*j* (j=1, . . . , M, wherein M is an integer number) of the class table 400 corresponds to a respective TCP session class (or data flow class). Considering the generic table row 405*j*, a first entry Id_Class_C[j] (table column 410) is used to store a value that is a unique TCP session class identifier, adapted to univocally identifying a TCP session class. A generic TCP session class includes TCP sessions related with software applications that are identified by software application identifiers/values stored in a second entry Applications[j] (table column 415) of the class table 400. For example, the TCP session class "1" may comprise all the TCP sessions associated with background software applications, such as P2P applications which can provoke a network congestion; example of well-known P2P applications are eMule, Bittorrent, Microtorrent, Kazaa; the TCP session class "2" may include VoIP applications, such as Skype; the TCP session class "3" may include Web browsing applications, like Mozilla Firefox and Microsoft Internet Explorer; the TCP session class "4" may include applications for audio/video streaming, like Windows Media Player.

Each row 405*j* of the class table comprises further entries, wherein data useful to characterize each specific TCP session class are stored.

A third entry Recipients[j] (table column 420) is used to store IP addresses of network entities which, in respect of the TCP sessions belonging to a specific TCP session class, act as recipients of data packets (in the example herein considered, the first client 105*a*).

A fourth entry Senders[j] (table column 425) is used to store IP addresses of network entities which, in respect of the TCP sessions belonging to a specific TCP session class, act as senders (in the example herein considered, the senders may be the content provider 110 and/or the second client 105*b*).

A fifth entry Max Bandwidth[j] (table column 430) is used to store a value indicating a maximum download bandwidth to which a current download bandwidth of the TCP sessions belonging to a specific TCP session class will be limited under circumstances defined by a value stored in a sixth entry Conditions[j] (table column 435), such a value defining a percentage of the capacity (in terms of bit-rate) of the gateway ports assigned to the recipients whose IP addresses are listed in the third entry Recipients[j] (i.e. the maximum transmission bandwidth allocated for download and upload data flows to a certain recipient, in the example here considered the first client 105*a*); in case the control system 200 detects that such a percentage of the gateway port capacity is exceeded, the transmission bandwidth for download and upload data flows of the TCP sessions of the considered TCP session class is limited to the value stored in the fifth entry Max Bandwidth[j].

A seventh entry Flow number[j] (table column 440) is used to store a value that indicates a current number of active TCP sessions belonging to a specific TCP session class.

An eighth entry Actual Bandwidth[j] (table column 445) is used to store a value indicating a current download bandwidth exploited by download data flows of TCP sessions belonging to a specific TCP session class.

A ninth entry Policy Status C[j] (table column 450) is used to store a Boolean value indicating the current enforcement of the limitation of the transmission bandwidth usage—for sake of brevity referred to anti-congestion policy hereinafter—for a specific TCP session class.

The class table entries are initialized to initial values that, for example, may be empirically determined through a statistical analysis of the history of previously established TCP sessions in respect of a specific gateway (in the example herein considered the first gateway 115*a*); in particular, the following parameters are determined from the statistical analysis: frequency of establishment of TCP sessions of the various TCP session classes, volume of data transferred during TCP sessions of the various TCP session classes, average time duration of the TCP sessions, average transmission bandwidth used by the TCP sessions during their life, IP addresses of the senders and recipients; hereinafter, reference will be made to these and other possible parameters derived from the statistical analysis as "TCP sessions trends" parameters. For example, the values initially stored in the third entry Recipients[j] (column 420) corresponds to the IP addresses of the recipients connected to the first gateway 115*a* (in the herein considered example, the first client 105*a*), while the values stored in the fourth entry Senders[j] (column 425) correspond to the IP addresses of the senders, which can be other clients (such as the second client 105*b*) or content providers (such as the content provider 110) usually acting as senders in the past TCP sessions. The seventh entry Flow number [j] (column 440) and the eighth entry Actual Bandwidth[j] (column 445) may be initially set to a null value, and the values stored in such entries will be periodically updated by the traffic meter module 235 based on an analysis conducted by it (as will be described in the following). The values stored in the class table entries may be updated manually and/or automatically in order to adjust the control system 200 operations on the basis of changes in the network traffic that may occur over time (e.g. an increase/reduction of the number of established TCP sessions of a certain TCP session class.

Figure 5:
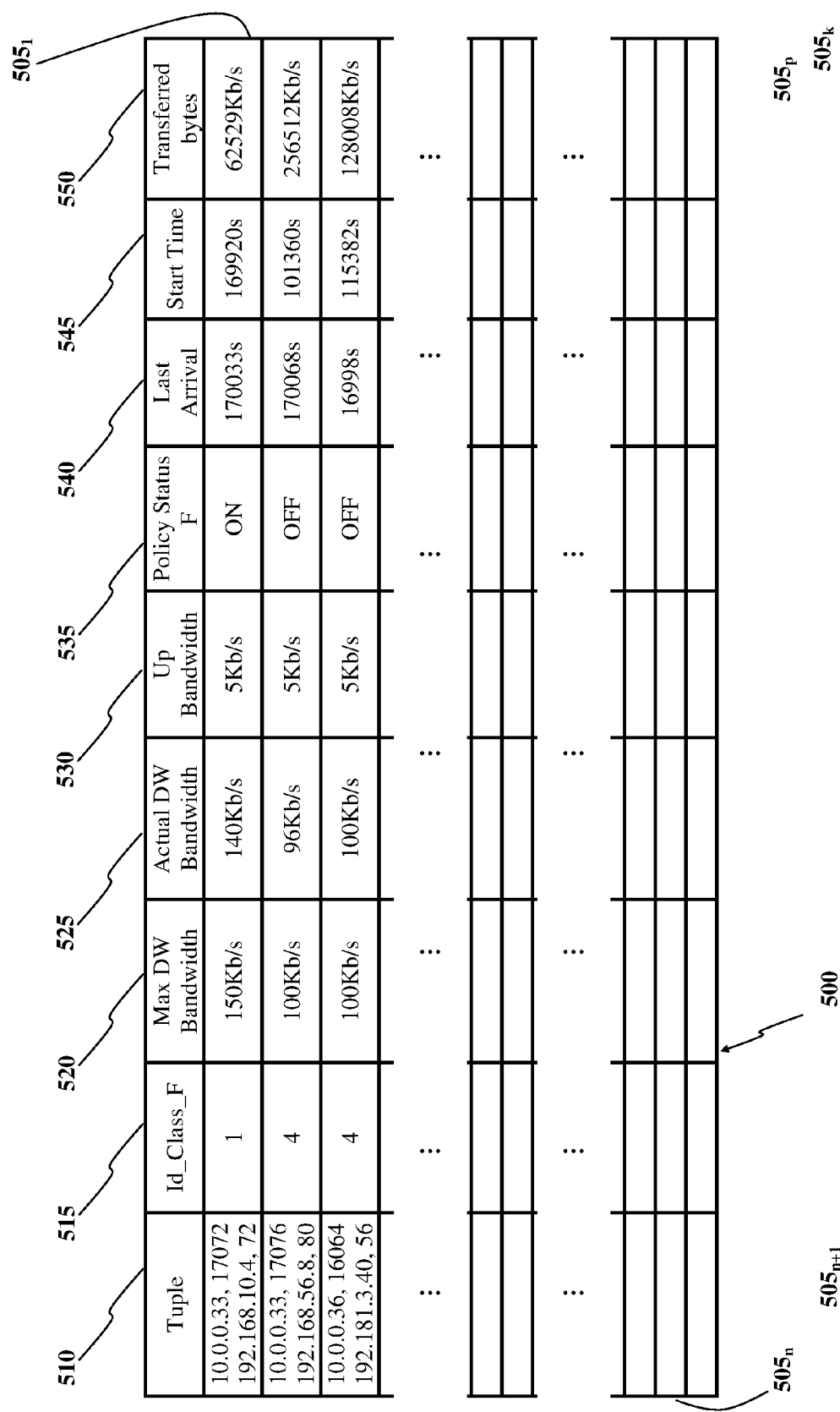
FIG. 5 conceptually illustrates a flow table stored in the memory included in the control system of FIG. 2.
Figure 6:
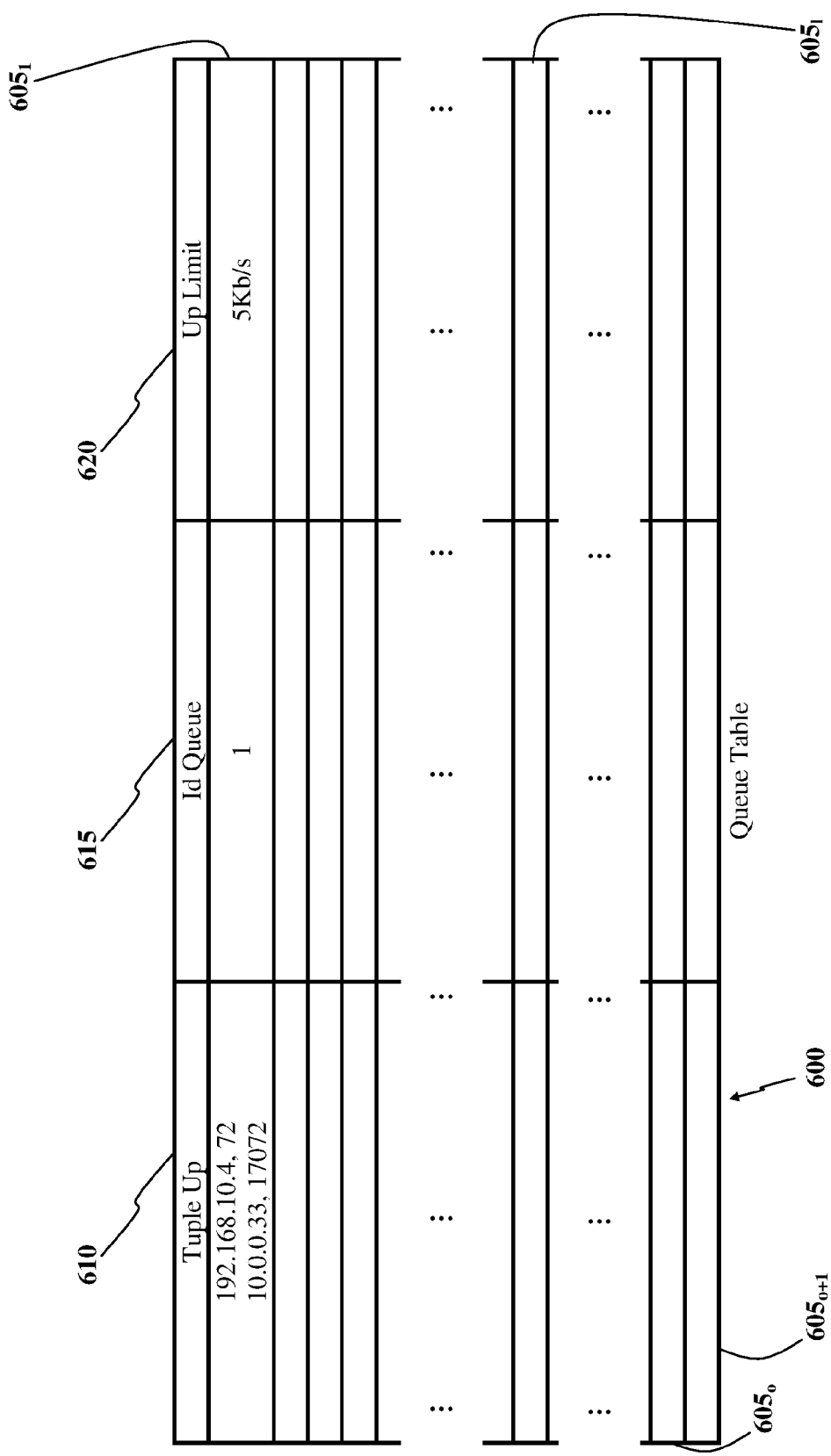
FIG. 6 conceptually illustrates a queue table stored in the memory included in the control system of FIG. 2.

In operation, the control system 200 monitors the download and upload data flows of each TCP session (as will be described in the following) and stores information about them in two corresponding sectors of the memory 240 hereinafter defined as flow table 500, conceptually illustrated in FIG. 5, and queue table 600, conceptually illustrated in FIG. 6, respectively.

In more detail, each row 505*k* (k=1, . . . , n, wherein n is an integer number) of the flow table 500 includes entries used to store values adapted to characterize each established TCP session. In particular, considering a generic table row 505*k*, a first entry "Tuple[k]" (table column 510) is used to store the headers or tuples of the data packets of a specific TCP session, said headers or tuples containing the addresses of the recipient and sender of the data packets. A second entry "Id_Class_F[k]" (table column 515) is used to store a value identifying to which TCP session class the considered TCP session belongs. A value stored in a third entry "Max DW Bandwidth [k]" (table column 520) indicates the maximum download bandwidth usage set in respect of the considered TCP session; this value, that corresponds to a limit of the bandwidth usage for the download data flow of the TCP session, set by the control system 200 when the anti-congestion policy is activated, is a fraction of a corresponding value stored in the fifth entry Max Bandwidth[j] of the class table 400 (as will be explained in the following). A fourth entry Actual DW Bandwidth[k] (table column 525) is used to store a value that indicates a current download bandwidth (i.e., the bandwidth currently used by the download data flow) associated to the considered TCP session. A fifth entry UP Bandwidth[k] (table column 530) is used to store a value that indicates a maximum upload bandwidth usage set in respect of the considered TCP session; this value, similarly to the value stored in the third entry "Max DW Bandwidth [k]", is a limit of the bandwidth usage for the upload data flow of the TCP session set by the control system 200 when the anti-congestion policy is activated. A sixth entry "Policy Status F[k]" (table column 535) is used to store a Boolean value acting as an indicator of the status of the anti-congestion policy for the considered TCP session. A seventh entry Last Arrival[k] (table column 540) is used to store a time indicator value corresponding to the arrival time (e.g. coded as Unix time) of the last data packet of the download data flow of the considered TCP session. An eighth entry Start Time[k] (table column 545) is used to store a time indicator value corresponding to a start time (e.g. coded as Unix time) of the download data flow (i.e. the arrival time of the first data packet of the download data flow). A ninth entry Transferred Bytes [k] (table column 550) is used to store a value representing the volume of data transferred (e.g. in bytes) by the download data flow.

The queue table 600 is used to store information exploited by the tuple classifier module 205 of FIG. 2 to manage the acknowledgement packets included in the upload data flows of each established TCP sessions (as will be discussed in the following). Each row of the queue table 600 corresponds to a specific TCP session. Particularly, the generic row 605*l* (l=1, . . . , o, wherein o is an integer number) of the queue table 600 includes the following entries. A first entry Tuple UP[l] (table column 610) is used to store the tuple forming the header of the acknowledgement packets included in the upload data flow of the considered TCP session. A second entry Id_Queue[l] (table column 615) is used to store a value that univocally identifies an acknowledgment queue sub-module among the plurality of acknowledgment queue sub-modules 210 shown in FIG. 2; the acknowledgment queue sub-module identified by the value stored in this table entry is exploited to store a queue of acknowledgement packets included in the upload data flow of the considered TCP session. The acknowledgement packets are for example stored in the queue according to a FIFO—"First In First Out"—criterion. A value stored in a third entry UP Limit[l] (table column 620) defines the maximum upload bandwidth usage and corresponds to the value stored in the entry UP Bandwidth[k] of the row of the flow table 500 that corresponds to the considered TCP session (as will be described in greater detail in the following).

The operation of the control system 200 will be now described, making reference to FIGS. 1-6.

In the following, purely by way of example, it will be assumed that the TCP sessions established between the first client 105*a* and the content provider 110 correspond to foreground software applications (such as, for example, a Web browser running on the first client 105*a*, and/or a VoIP application, and/or an audio/video streaming application), whereas the TCP sessions established between the first client 105*a* and the second client 105*b* correspond to background software applications (such as for example one or more P2P applications).

The data packets of the download data flows associated with all the TCP sessions in which the first client 105*a* is involved pass trough the first gateway 115a and are analyzed by the control system 200, in particular by the download control sub-system 200b on their route from the sender (the content provider 110 or the second client 105b) to the recipient (the first client 105a).

Let the data packets of the download data flow of a first generic TCP session established between the content provider 110 and the first client 105a (which, as mentioned above, it is assumed to be a TCP session associated with a foreground software application) be denoted as DF, and the respective acknowledgement packets (included in the associated upload data flow) be denoted as AF. Similarly, let the data packets of the download data flow of a second generic TCP session established between the second client 105b and the first client 105a (which, as mentioned above, it is assumed to be a TCP session associated with a background software application) be denoted as DB, and the respective acknowledgement packets (included in the associated upload data flow) be denoted as AB.

In the download control sub-system 200b each data packet DF and DB of the download data flows of the first and second TCP sessions is analyzed by the flow identifier module 230, by the end flow module 225, and by the traffic meter module 235.

Specifically, the flow identifier module 230 identifies which type of software application is associated to a considered TCP session by analyzing the tuple (i.e., the header) of the data packets DF and DB received at its input; this can for example be achieved by using a suitable algorithm (e.g., the algorithm disclosed in the aforementioned US patent application 2005/0190694). Subsequently, the flow identifier module 230 sends a data flow message, containing the analyzed tuple and a software application identifier, to the insert flow sub-module 310.

Considering for example the second TCP session defined hereinabove (i.e., a TCP session established by a background software application—e.g., a P2P application—between the second client 105b—acting as the sender of the TCP session—and the first client 105a—acting as the recipient of the TCP session), the flow identifier module 230 analyses a tuple TDB of the generic data packet DB and, from the information contained in the tuple TDB (information indicating that the second client 105b is the sender and the first client 105a is the recipient), the flow identifier module 230 identifies the corresponding software application, that in this case is a background software application.

Similarly, in the case of a TCP session corresponding to a foreground software application (e.g., a web browser), like the first TCP session defined above, which has been assumed to be a TCP session between the content provider 110—acting as the sender of the TCP session—and the first client 105a—acting as the recipient of the TCP session—, the flow identifier module 230 analyses for each incoming data packet DF, a respective tuple TDF and, from the information contained in the tuple, the flow identifier module 230 identifies the corresponding software application that in this case is a foreground software application.

The insert flow sub-module 310, upon receiving, from the flow identifier module 230, for example, the tuple TDB, corresponding to an incoming data packet DB and containing the IP addresses of the respective sender and recipient, and the software application identifier, scans the second, the third and the fourth entries Applications[j], Recipients[j] and Servers[j] of the flow class table 400 (table columns 415, 420 and 425), searching therein for a table row containing values that match with the received software application identifier, recipient IP address and sender IP address, respectively. If for example a table row $405_j$ is identified as storing values in the entries Applications[j], Recipients[j] and Servers[j] that match with the values extracted by the flow identifier module 230 from the incoming data packet, then the insert flow sub-module 310 classifies the TCP session associated with the considered data packet as belonging to the TCP session class identified by the value stored in the entry Id_Class_C[j] (table column 410) of the table row $405_j$. Specifically, upon receiving a tuple TDB corresponding to a data packet DB of the first TCP session, the insert flow sub-module 310 classifies the respective TCP session as belonging to the TCP session class "1" (background software applications); upon receiving a tuple TDF corresponding to a data packets DF of the second TCP session, the insert flow sub-module 310 classifies the respective TCP session as belonging to the TCP session class "2", or "3", or "4" (depending on the associated foreground software application).

Otherwise, if the tuple and the respective software application do not belong to a TCP session class listed in the class table 400, the associated session is not subjected to the control exerted by the control system 200. This may occur when data packets passing through the first gateway 115a do not belong to protocols based on acknowledgements of correct receipt, such as for example the User Datagram Protocol (UDP).

The insert flow sub-module 310 then scans the flow table 500 searching in the first entries Tuple[k] (table column 510) of the table rows a value corresponding to the tuple TDB and in the second entries Id_Class_F[k] (table column 515) a value equal to the TCP session class previously identified in the entry Id_Class_C[j] of the class table 400.

If no matches are found in any row $505k$ of the flow table 500, the insert flow sub-module 310 creates a new table row $505n+1$ and initializes the entries of the new table row in the following way. The value of the first entry Tuple[n+1] of the new row $505n+1$ is set equal to the tuple TDB extracted from the incoming data packet DB; the value of the second entry Id_Class_F[n+1] of the new row $505n+1$ is set equal to the value stored in the entry Id_Class_C[j] of the table row $405_j$, in the meantime, the value stored in the entry Flow Number [j] of the table row $405_j$ is increased by one, because the incoming data packet corresponds to a new TCP session belonging to the TCP session class corresponding to the value stored in the entry Id_Class_C[j] of the table row $405_j$; the values stored in the third and fourth entries Max DW Bandwidth[n+1] and Actual DW Bandwidth[n+1] of the new row $505n+1$ are both initialized to Max Bandwidth [j]/Flow Number[j] whereas the value stored in the entry UP Bandwidth[n+1] of the new row $505n+1$ is initialized to (Max Bandwidth [j]/Flow Number [j])/S (where S is a heuristic scaling value determined on the basis of a statistical analysis of the upload bandwidth usage of the TCP sessions of the identified TCP session class, in order to grant a maximum upload bandwidth proportional to the corresponding maximum download bandwidth). In this way, when the anti-congestion policy is activated, the transmission bandwidth is equally shared between the entire download and upload data flows of the TCP sessions belonging to the same TCP session class. The value stored in the entry Policy Status F[n+1] of the new row $505n+1$ is initialized to the value stored in the corresponding entry Policy Status C[j] of the table row $405_j$; the values stored in the entries Last Arrival[n+1] and Start Time[n+1] of the new row $505n+1$ are both initialized to the current time t (i.e. the arrival time of the currently analyzed data packet DB in the first gateway 115a); the value stored in the entry Transferred Bytes[n+1] of the new row 505n+1 is initialized to the length of the data packet DB.

Subsequently, the insert flow sub-module 310 scans the flow table 500 looking for any table row 505k in which the value stored in the entry Id_Class_F[k] is equal to the value stored in the first entry Id_Class_C[j] of the table row 405$_j$ (same TCP session class as the TCP session identified in the row 505n+1) and modifies the value stored in the entry UP Bandwidth[k] of the identified rows 505k to UP Bandwidth [k]=UP Bandwidth[k]·(Flow Number[j]−1)/(Flow Number [j]), thereby equally sharing the maximum upload bandwidth among the upload data flows of the TCP sessions belonging to the same TCP session class. In this way, all the upload data flows of the TCP sessions belonging to the same TCP session class are equally slowed down, thus increasing a delay imposed by the control system 200 (when the anti-congestion policy is activated) to each upload data flow associated with the considered TCP sessions. In addition, if the value stored in the entry Policy Status F[k] of the rows 505k is asserted (i.e. at an "ON" value, policy activated), the insert flow sub-module 310 sends a message to the activate queue sub-module 320 containing the tuples stored in the entry Tuple[k] of the rows 505k.

Otherwise, if a matching row 505k is found in the flow table 500 in which the value stored in the entry Tuple[k] corresponds to the tuple TDB (extracted from the incoming data packet DB) and the value stored in the entry Id_Class_F [k] is equal to the value stored in the entry Id_Class_C[j] of the table row 405$_j$, the insert flow sub-module 310 updates the value of the entry Last Arrival[k] of the matching row 505k (not shown in FIG. 5) to the current time t and increases by one the value stored in the entry Flow Number [j] of the table row 405$_j$. Consequently, the values stored in the entries Max DW Bandwidth [k], Actual DW Bandwidth [k] and UP Bandwidth[k] of every row 505k for which the value stored in the entry Id_Class_F[k] is equal to the values stored in the entry Id_Class_C[j], are updated according to the way described above.

The end flow module 225 analyses any incoming download data flow for detecting an end of the associated TCP session; this can be done by detecting special information that, according to the TCP standard, are contained in the last data packet of the considered TCP session. When the end flow module 225 detects this event, it sends to the remove flow sub-module 315 an "end data flow" message containing the tuple extracted from the last data packet of the TCP session.

Let a TCP session associated with a background software application be considered: the last data packet of the TCP session contains the tuple TDB. After receiving the "end data flow" message from the end flow module 225, the remove flow sub-module 315 scans the flow table 500 looking for a table row containing, in the entry Tuple[k], a value matching with the tuple TDB.

If a match is found, the remove flow sub-module 315 performs the following operations. Firstly, it decreases by one the value stored in the entry Flow Number[j] of the row of the class table 400 for which the value stored in the entry Id_Class_C[j] is equal to the value stored in the entry Id_Class_F[k]. Secondly, it scans the flow table 500 looking for any row 505p in which the value stored in the entry Id_Class_F[p] is equal to the value stored in the entry Id_Class_C[j], in order to modify the value stored in the entry UP Bandwidth[p] in the following way:

UP Bandwidth[p]=UP Bandwidth[p]·(Flow Number [j]−1)/(Flow Number[j]).

In this way, the fraction of maximum upload bandwidth left free by the ended TCP session is equally redistributed among the other TCP sessions of the same TCP session class still active. Henceforth, the delay imposed by the control system 200 to the upload data flows of the TCP sessions still active is reduced. Thirdly, the remove flow sub-module 315 scans the queue table 600 looking for a row containing in the entry Tuple-UP[l] a value corresponding to the value stored in the entry Tuple[k], then it frees the associated queue (i.e., one of the acknowledgment queue sub-modules 210) which is identified by the value stored in the entry Id_Queue[l] and removes the entire row from the queue table 600. Lastly, the remove flow sub-module 315 deletes the entire row 505k from the flow table 500.

The traffic meter module 235 monitors the data packet DB and DF of each download data flow received at its input and determines the data packet's tuple and length (i.e. its size in bits). In addition, the traffic meter module 235 estimates the overall current download bandwidth of each port of the first gateway 115a. This estimation is based on the calculation of an average value over a predetermined observation time T (e.g., the overall current download bandwidth usage is estimated as the ratio between the number of bytes passed trough the first gateway 115a during the observation time T and the observation T itself, which can be for example set equal to 5 minutes). The result of such estimation is stored in the memory 245 as a variable denoted Total Download Bandwidth. Further, the traffic meter module 235 calculates (and stores in the entry Actual DW bandwidth[k] of each row 505k of the flow table 500) the actual download bandwidth of each active TCP session (for example, the actual download bandwidth of an active TCP session may be calculated as a ratio between the total number of bytes of the data packets contained in the download data flow of the TCP session and the time duration of the TCP session itself). This calculation may be carried out in the following way. The traffic meter module 235 scans the flow table 500 looking for a match between the value stored in the entry Tuple[k] of any rows of the flow table 500 and, for example, the tuple TDB extracted from an incoming data packet DB of the download data flow under consideration. If the tuple TDB matches the value stored in the entry Tuple[k] of a row 505k of the flow table 500, the length of the data packet DB is added to the value stored in the entry Transferred Bytes[k] of the row 505k, while the value stored in the entry Last Arrival[k] of the row 505k is updated at the current time t (that is the arrival time of the data packet DB). Thereafter, the value stored in the entry Actual DW Bandwidth[k] of the row 505k may be calculated as:

$$\text{Actual } DW \text{ Bandwidth } [k] = \frac{\text{Transferred Bytes } [k] \cdot 8}{(t - \text{Start Time}[k]) \cdot 10^3},$$

measured in Kb/s.

It is pointed out that other evaluation techniques may be employed as well such as for example to consider a sliding windows instead of the session duration (t−Start Time [k]) and the number of bytes transferred during the sliding windows duration.

After having been analyzed by the control system 200, each data packet DB, DF is then routed by the first gateway 115a towards its recipient, in the considered example the first client 105a. Upon correct receipt of the data packet, the first client 105a generates and sends back to the sender (i.e., in the considered example, the second client 105b or the content provider 110) a corresponding acknowledgment packet AB, AF. The acknowledgment packet AB, AF is received by the first gateway 115a and is processed by the upload control sub-system 200a of the control system 200 before being routed into the network 100 to the intended acknowledgment packet recipient.

Specifically, upon arrival of an acknowledgment packet AB, AF, the tuple classifier module 205 identifies the associated acknowledgment packet tuple TUB, TUF and scans the queue table 600 looking for a matching value stored in the entry Tuple UP[l] of one of the queue table rows. If the received acknowledgment packet is an AB packet, acknowledging the receipt by the first client 105a of a data packet DB of a TCP session associated with a background software application, and a match is found in the queue table 600, then the acknowledgment packet AB is put in the queue of one of the acknowledgment queue sub-modules 210, particularly the acknowledgment queue sub-module 210 that is identified by the value stored in the entry Id_Queue[l] of the identified row. If the received acknowledgment packet is an AF packet, acknowledging the receipt by the first client 105a of a data packet DF of a TCP session associated with a foreground software application, then the received acknowledgment packet AF is directly put into the queue of the output queue 215.

The shaper module 220 performs, in an ordered way, the extraction (in jargon, shaping) of the acknowledgment packets AF from the output queue 215 (for example in a "FIFO" way) and their routing toward the intended recipient (which in the present example is the content provider 110) at the maximum allowed bit-rate. Instead, the acknowledgment packets AB queued in the acknowledgment queue sub-modules 210 are sequentially extracted therefrom (for example, the acknowledgment queue sub-modules 210 are scanned in a "Round Robin" way and put into the output queue 215, from where they are routed toward the intended recipient (in the example herein considered, the second client 105b). The rate at which the acknowledgment packets AB corresponding to different TCP sessions are extracted from their queues is determined by the value stored in the entry UP limit[l] of the row previously identified in the queue table 600. Hence, on the basis of this value it is possible to selectively delay the extraction of the acknowledgment packets AB of the TCP sessions associated to background software applications.

Since the sender of the data packets of a specific TCP session waits for sending further data packets until it receives from the recipient of the data packets an acknowledgment packet, acknowledging the correct reception of the data packets previously sent, by selectively delaying the forwarding of the acknowledgment packets of some specific TCP sessions (i.e., the TCP sessions of a certain TCP session class) the data flows of such TCP sessions are selectively delays.

It should be noted that the delay imposed to the acknowledgment packets should be lower than an acknowledgement time-out (determined by the used protocol, that can be the TCP protocol or a different protocol), after which the sender (the second client 105a or the content provider 110) determines that a fault in the transmission has occurred and thus it retransmits the data packet.

The clean-up sub-module 325 is configured for periodically analyzing the class table 400 and the flow table 500, examining the values stored in their entries row by row and adjusting/correcting the values stored therein and in the queue table 600 accordingly. These operation are exploited on the basis of heuristic functions derived from the evolution in time of the aforementioned TCP sessions (for example, changes in frequency of the establishment of the different TCP sessions, volume of data transferred by the TCP sessions, average time duration of the TCP sessions, average transmission bandwidth used by the TCP sessions during their life, IP addresses of the senders and of the recipients).

The clean-up sub-module 325 performs a set of operations on the entries of each row 505k of the flow table 500. In particular, the clean-up sub-module 325 verifies if $$t-\text{Last Arrival}[k] > \text{TO} \quad (1)$$

where TO is a timeout determined in a heuristic way (e.g., from the observation of times intervals between the arrival times in the first gateway 115a of data packets of a same TCP session). If the condition (1) is verified, an anomalous conclusion of the download data flow identified by the row 505k is recognized, which is considered an end of the related TCP session. In this case, the clean-up sub-module 325 sends a message to the remove flow sub-module 315 containing the value stored in the entry Tuple[k] of the table row 505k in order to determine the deletion of the row 505k from the flow table 500 and of the related row from the queue table 600, as previously described.

If the condition (1) is not verified, the clean-up sub-module 325 determines if $$\text{Actual DW Bandwidth}[k] > Z1 * \text{Maximum DW Bandwidth}[k] \quad (2)$$

where Z1>1 is a system parameter defining the allowed maximum positive deviation in percentage between the Actual DW bandwidth and the Maximum DW Bandwidth; as an example Z1=1.1. If the condition (2) is verified, the clean-up sub-module 325 modifies the value stored in the entry UP Bandwidth[k] of the row 505k so that $$\text{UP Bandwidth}[k] = \text{UP Bandwidth}[k] * (1-(\text{Actual DW Bandwidth}[k]-\text{Maximum DW Bandwidth}[k])/\text{Maximum DW Bandwidth}[k])$$

In this way the extraction of the acknowledgement packet of the considered TCP session is further delayed in order to further reduce the bandwidth usage.

Otherwise, the clean-up sub-module 325 verifies if $$\text{Actual DW Bandwidth}[k] < Z2 * \text{Maximum DW Bandwidth}[k] \quad (3)$$

wherein Z2 is a system parameter defining the allowed maximum negative deviation in percentage between the Actual DW bandwidth and the Maximum DW Bandwidth; as an example Z2=0.95. If the condition (3) is verified, the clean-up sub-module 325 modifies the entry UP Bandwidth[k] of the row 505k in the following manner $$\text{UP Bandwidth}[k] = \text{UP Bandwidth}[k] * (1+(\text{Maximum DW Bandwidth}[k]-\text{Actual DW Bandwidth}[k])/\text{Maximum DW Bandwidth}[k]).$$

In this way, the extraction of the acknowledgement packets of the considered TCP session is accelerated since the download bandwidth usage may be increased.

Subsequently, if the value stored in the entry Policy Status F[k] is "ON" and the value of the entry UP Bandwidth[k] of the row 505k has been modified as described above, the clean-up sub-module 325 scans the queue table 600 looking for a value stored in the entry Tuple UP[l] which corresponds to the value stored in the entry Tuple[k] of the row 505k and consequently it modifies the value stored in the entry UP Limit[l] to the value stored in the entry UP Bandwidth[k], in order to take into account of the delays associated with the evolution of the network traffic.

Moreover, the clean-up sub-module 325 periodically verifies if the anti-congestion policy should be activated with respect to the TCP session classes listed in the class table 400.

In more detail, for each given row 405j of the class table 400 the clean-up sub-module 325 determine if:

$$\text{Total Download Bandwidth} > \text{Condition}[j] \cdot \text{gateway port capacity} \quad (4)$$

where gateway port capacity is a constant value (stored in the memory 245) corresponding to the maximum number of data packets that may be routed at the same time (measured in Kb/s) by the port of the first gateway 115a supporting the communication between the first client 105a and the second client 105b or the content provider 110.

If the condition (4) is verified, an excessive transmission bandwidth usage is detected and the clean-up sub-module 325 set to "ON" the value stored in the entry Policy Status C[j] in the respective row (thereby activating the anti-congestion policy) and scans the flow table 500 looking for every row 505k wherein $$\text{Id\_Class\_F}[k] = \text{Id\_Class\_C}[j],$$

Setting to "ON" the value stored in the entry Policy Status F[k] in for all the identified rows 505k and thus activating the anti-congestion policy for the associated TCP sessions, all belonging to the TCP session class identified by the entry Id_Class_C[j]. At the same time, the clean-up sub-module 325 sends a message containing the Tuple[k] to the activate queue sub-module 320, in order to queue the acknowledgement packets of the selected TCP sessions in respective acknowledgement queue sub-modules 210 as previously described.

The clean-up sub-module 325 also determines if $$\text{Actual Bandwidth}[j] > Z3 * \text{Maximum Bandwidth}[j]), \quad (5)$$

where Z3 is a system parameter defining the allowed maximum negative deviation in percentage between the Actual bandwidth and the Maximum Bandwidth; as an example Z3=1.1. If the condition (5) is verified, the clean-up sub-module 325 searches each row 505k wherein $$\text{Id\_Class\_F}[k] = \text{Id\_Class\_C}[j]$$

and it modifies the corresponding value UP Bandwidth[k] so that $$\text{UP Bandwidth}[k] = \text{UP Bandwidth}[k] * (1 - (\text{Actual Bandwidth}[j] - \text{Maximum Bandwidth}[j])/\text{Maximum Bandwidth}[j])$$

Otherwise, the clean up sub-module 325 verifies if:

$$\text{Actual Bandwidth}[j] < Z4 * \text{Maximum Bandwidth}[j] \quad (6)$$

wherein Z4 is a system parameter defining the allowed maximum negative deviation in percentage between the Actual bandwidth and the Maximum Bandwidth; as an example Z4=0.95. If the condition (6) is verified, the clean-up sub-module 325 searches each row 505k wherein $$\text{Id\_Class\_F}[k] = \text{Id\_Class\_C}[j]$$

and it modifies the corresponding entry UP Bandwidth[k] so that $$\text{UP Bandwidth}[k] = \text{UP Bandwidth}[k] * (1 + (\text{Maximum Bandwidth}[j] - \text{Actual Bandwidth}[j])/\text{Maximum Bandwidth}[j]).$$

Subsequently, if the value stored in the entry Policy Status F[k] is "ON" and the entry UP Bandwidth[k] has been modified as described above, the clean-up sub-module 325 scans the queue table 600 looking for a value stored in the entry Tuple UP[l] which corresponds to the value stored in the entry Tuple[k] and it modifies the value stored in the entry UP Limit[l] to the value stored in the entry UP Bandwidth[k], in order to adjust the delay associated with the acknowledgement packets of the considered TCP sessions.

The clean-up sub-module 325 also verifies if $$\text{Total Download Bandwidth} < \text{Condition}[j] * \text{gateway port capacity} \quad (7)$$

If the condition (7) is verified the actual load of the gateway port does not require that the bandwidth usage of the TCP sessions associated to the row j of the Class Table 400 be reduced, hence the clean-up sub-module 325 sets to "OFF" the value stored in the entry Policy Status C[j] and scans the flow table 500 looking for every row 505k wherein $$\text{Id\_Class\_F}[k] = \text{Id\_Class\_C}[j],$$

setting to "OFF" the corresponding value stored in the entry Policy Status F[k]. In the meantime, the clean-up sub-module 325 searches each row 605l of the queue table 600 having a value stored in the entry Tuple UP[l] which corresponds to the value stored in the entry Tuple[k] of the rows 505k of the flow table 500. Then, the clean-up sub-module 325 removes the rows 605l so identified from the queue table 600. Further, the clean up sub-module 325 sends a message to the activate queue sub-module 320 containing the value stored in the entry Tuple UP[l] of the deleted rows 605l in order to determine the release of the acknowledgement queue sub-module 210 identified by the entries Id_Queue[l] of the deleted rows. In this way, the upload data flow stored in the acknowledgement queue sub-module 210 so identified will be directly queued into the output queue 215.

Regarding the activate queue sub-module 320, upon the arrival of messages from the insert flow 310 sub-module, it creates a new row 605o+1 in the queue table 600, and it calculates and stores a value in the entry Tuple UP[o+1] corresponding to the value stored in the entry Tuple[k]. Subsequently, the activate queue sub-module 320 initializes the value stored in the entry Id_Queue[o+1] to a value corresponding to an empty acknowledgment queue sub-module 210, and initializes the value stored in the entry UP Limit[o+1] to the value stored in the entry UP Bandwidth[k].

As should be noted from the above description, the control system 200 according to an embodiment of the present invention is adapted to discriminate between data packets associated to foreground software applications and data packets associated to background software application in order to delay the forwarding of the acknowledgment packets of the TCP sessions associated to the background software applications so as to avoid network congestion and to grant a sufficient download bandwidth to the foreground software applications requiring it for operating in an efficient way.

The invention claimed is:

1. A control system for managing data flows between sender data circuitry and recipient data circuitry, said data flows being originated by applications running on the recipient data circuitry and passing through at least one gateway of a telecommunications network, the control system comprising:

data flow identifier circuitry configured to discriminate data packets, sent by the sender data circuitry to the recipient data circuitry, as belonging to different data flows depending on respective applications from which the data flows are originated; and acknowledgement packet delayer circuitry configured to:
  detect acknowledgment packets received from the recipient data circuitry for acknowledging the receipt of corresponding data packets received from the sender data circuitry,
  discriminate among the acknowledgment packets received from the recipient data circuitry, depending on the data flow to which the acknowledgment packets pertains, and
  selectively delay the forwarding of the acknowledgment packets to the sender data circuitry, said selectively delaying depending on the data flow to which the acknowledgment packets relate.

2. The control system of claim 1, further comprising:
flow monitor circuitry configured to monitor a usage of transmission bandwidth of said gateway by said data flows; and
supervisor circuitry configured to command said acknowledgement packet delayer circuitry to start selectively delay the forwarding of the acknowledgment when a threshold transmission bandwidth usage is reached.

3. The control system of claim 2, wherein
the supervisor circuitry is configured to classify the data flows originated by applications running on the recipient data circuitry in:
  at least one first data flow class comprising data flows originated by a background applications running on the recipient data circuitry; and
  at least one second data flow class comprising data flows originated by a foreground application running on the recipient data circuitry, and
the acknowledgement packet delayer circuitry is configured to selectively delay the forwarding to the sender data circuitry of the acknowledgment packets of data flows belonging to the first data flows class.

4. The control system according to claim 3, wherein the acknowledgement packet delayer circuitry includes a plurality of acknowledgment packet queues, each of which, in use, is configured to store acknowledgment packets of the at least one first data flows class.

5. The control system according to claim 4, wherein the supervisor circuitry is configured to determine the selective delay to be applied to the forwarding of the acknowledgment packets of the data flows belonging to the at least one first data flows class based on a current number of data flows belonging to the at least one first data flow class.

6. The control system according to claim 5, wherein the supervisor circuitry is configured to detect a start of a new data flow of the at least one first data flows class and to accordingly modify said current number of data flows classified in the at least one first data flows class.

7. The control system according to claim 5, further comprising detection circuitry configured to detect a conclusion of an ended data flow classified in the at least one first data flow class and wherein the supervisor circuitry is configured to accordingly modify the current number of data flows classified in the at least one first data flows class.

8. The control system according to claim 7, wherein the supervisor circuitry is configured to dissociate the ended data flow classified in the at least one first data flows class a corresponding one out of the plurality of acknowledgment packet queues.

9. The control system according to claim 2, wherein the supervisor circuitry is configured to adjust each selective delaying of the forwarding of acknowledgement packet as a function of variations in the usage of transmission bandwidth by the data flows.

10. A gateway configured to route data packets sent from a sender data circuitry to a recipient data circuitry, and to route acknowledgement packets from the recipient data circuitry to the sender data circuitry, in a telecommunications network, said gateway including a control system according to claim 1.

11. A method for managing data flows sender data circuitry and recipient data circuitry, said data flows being originated by applications running on the recipient data circuitry and passing through at least one gateway of a telecommunications network, the method comprising:
discriminating, by data flow identifier circuitry, data packets, sent by the sender data circuitry to the recipient data circuitry, as belonging to different data flows depending on respective applications from which the data flows are originated;
detecting, by acknowledgement packet delayer circuitry, acknowledgment packets received from the recipient data circuitry for acknowledging the receipt of corresponding data packets received from the sender data circuitry;
discriminating, by the acknowledgement packet delayer circuitry, among the acknowledgment packets received from the recipient data circuitry, depending on the data flow to which the acknowledgment packets pertains; and
selectively delaying, by the acknowledgement packet delayer circuitry, the forwarding of the acknowledgment packets to the sender data circuitry, said selectively delaying depending on the data flow to which the acknowledgment packets relate.

12. The method of claim 11, further comprising:
monitoring, by flow monitor circuitry, a usage of transmission bandwidth of said gateway by said data flows; and
selectively delaying, by the acknowledgement packet delayer circuitry, the forwarding of the acknowledgment when a threshold transmission bandwidth usage is reached.

13. The method of claim 12, further comprising:
classifying, by supervisor circuitry, the data flows originated by applications running on the recipient data circuitry in:
  at least one first data flow class comprising data flows originated by a background applications running on the recipient data circuitry; and
  at least one second data flow class comprising data flows originated by a foreground application running on the recipient data circuitry; and
selectively delaying, by the acknowledgement packet delayer circuitry, the forwarding to the sender data circuitry of the acknowledgment packets of data flows belonging to the first data flows class.

14. The method according to claim 13, further comprising:
storing, by the acknowledgement packet delayer circuitry, acknowledgment packets of the at least one first data flows class in a plurality of acknowledgment packet queues.

15. The method according to claim 14, further comprising:
determining, by the supervisor circuitry, the selective delay to be applied to the forwarding of the acknowledgment packets of the data flows belonging to the at least one first data flows class based on a current number of data flows belonging to the at least one first data flow class.

16. The method according to claim 15, further comprising:
   detecting, by the supervisor circuitry, a start of a new data flow of the at least one first data flows class; and
   accordingly modifying, by the supervisor circuitry, said current number of data flows classified in the at least one first data flows class.

17. The method according to claim 15, further comprising:
   detecting, by detection circuitry, a conclusion of an ended data flow classified in the at least one first data flow class; and
   accordingly modifying, by the supervisor circuitry, the current number of data flows classified in the at leas one first data flows class.

18. The method according to claim 17, further comprising:
   dissociating, by the supervisor circuitry, the ended data flow classified in the at least one first data flows class with a corresponding one out of the plurality of acknowledgment packet queues.

19. The method according to claim 12, further comprising:
   adjusting, by the supervisor circuitry, each selective delaying of the forwarding of acknowledgement packet as a function of variations in the usage of transmission bandwidth by the data flows.

* * * * *